A. T. HERRICK.
PIPE COUPLING.
APPLICATION FILED NOV. 13, 1907.

921,247. Patented May 11, 1909.

WITNESSES:
Janet M. Wynkoop.
Ida T. Stanley.

INVENTOR.
Austin T. Herrick,
BY
Knight Bros
ATTORNEY

UNITED STATES PATENT OFFICE.

AUSTIN T. HERRICK, OF BRADFORD, PENNSYLVANIA.

PIPE-COUPLING.

No. 921,247.

Specification of Letters Patent.

Patented May 11, 1909.

Application filed November 13, 1907. Serial No. 401,994.

*To all whom it may concern:*

Be it known that I, AUSTIN T. HERRICK, a citizen of the United States, residing at Bradford, in the county of McKean and State of Pennsylvania, have invented certain new and useful Improvements in Pipe-Couplings, of which the following is a specification.

This invention relates to pipe couplings in which the sections are insulated one from another, and it has for an object to provide a coupling of this type which is inexpensive to manufacture, simple in operation and durable in use.

With this and other objects in view, the invention consists in the parts and combination of parts hereinafter to be described, shown in the accompanying drawings and more particularly pointed out in the appended claims.

Figure 1:
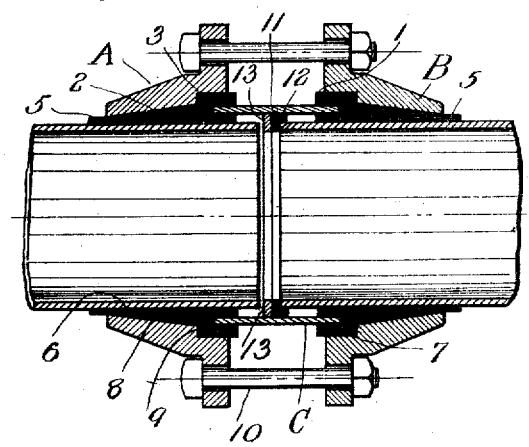
Figure 2:
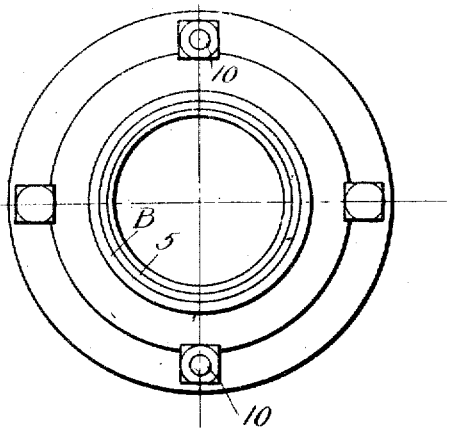
Figure 3:
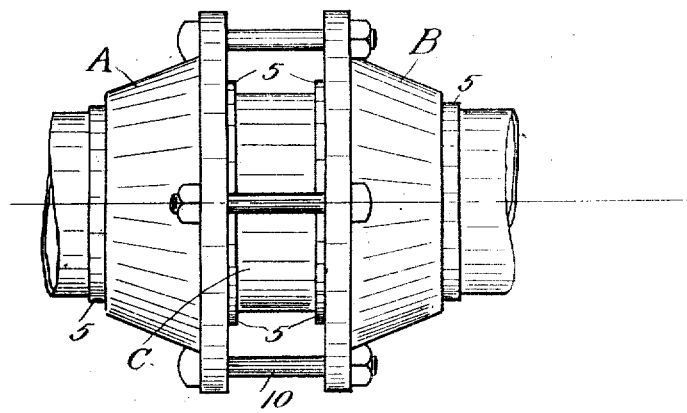

In the drawings, Figure 1 is a longitudinal section of the coupling attached to two pipe sections. Fig. 2 is an end view, and Fig. 3 is a side elevation.

The coupling shown comprises two collars A and B, two packing rings 8, and a connecting sleeve C. Each collar is formed with an enlarged cylindrical bore 1 and an alined elongated tapering bore 2, the greatest diameter of which is less than the diameter of the cylindrical bore to provide a shoulder 3. Each packing ring has a length greater than its collar, so as to project from the ends of the latter and is provided with an annular groove 5 at one end, a cylindrical bore 6 to fit a pipe section, a cylindrical peripheral portion 7 to fit bore 1, and a tapering peripheral portion 8 to fit bore 2, the greatest diameter of the latter being less than the diameter of the cylindrical peripheral portion so that a peripheral shoulder 9 is provided.

The sleeve C is formed of a piece of wrought iron pipe and at its ends projects into the annular grooves 5 in the packing rings, all parts being tightly clamped together by bolts 10. It will be noted that the packing rings 8 insulate the collars from the pipe sections throughout the lengths of the collars and that the projecting portions of the packing rings prevent even the extreme ends of the collars being brought into contact with the pipe sections by an uneven drawing of the collars together. Further the sleeve projecting into the annular grooves is insulated both from the pipe sections and the collars.

To prevent the ends of the pipe sections abutting or to prevent both sections engaging with the sleeve and thus forming an electrical connection between the sections, there is provided an annular ring 11 composed of insulating material and having an annular flange 12. This ring extends around the end of one of the sections in such manner as to cause the flange 12 to project over the end of said section, thus preventing this section contacting with any metal of the coupling. To facilitate the fitting of the ring 11 onto the section and at the same time to prevent the ring being removed by a strong current through the coupling, the sleeve C is preferably provided with an internal annular ring or shoulder 13 against which the ring lies. Said ring 13 is rigidly secured to the sleeve C in such position as to adapt it to hold the insulating ring 11 securely against the end of one pipe section while maintaining said shoulder out of contact with the end of the other pipe section.

Having thus described my invention, what I claim and desire to secure by Letters Patent, is:

1. The combination with the pipe-sections having adjacent ends to be connected; of a collar mounted on each of said pipe-sections, said collar having a bore larger than the outside diameter of the pipe upon which it is mounted; a non-conducting packing ring fitting the bore of the collar throughout and filling the space between the collar and the pipe, said ring having an annular groove in that end adjacent to the other section of pipe; a flanged ring of non-conducting material extending around the edge of one of the pipe-sections; and a sleeve mounted in the annular grooves of said packing rings and provided with an interior annulus for holding said flanged ring in position upon its pipe-section, said annulus being so positioned in the bore of said sleeve as to be maintained out of contact with the other pipe-section.

2. The combination with the adjacent ends of alined pipe-sections; of a collar mounted on each of said sections, said collar having a bore larger than the outside diameter of the pipe; an insulating packing ring filling the space between the pipe and the collar throughout the length of the bore of said collar, said packing rings having circular grooves in the adjacent ends thereof; a sleeve mounted in said grooves, said sleeve having an annular lug projecting between the adjacent ends of the pipe sections but out of contact therewith; and a non-conducting ring for filling the interval between said annular lug and one of the pipe ends.

The foregoing specification signed at Bradford this 25th day of January, 1907.

AUSTIN T. HERRICK.

In presence of two witnesses—
 CHARLES COIT,
 W. T. PACE.